(12) United States Patent
Shin et al.

(10) Patent No.: US 9,475,703 B2
(45) Date of Patent: Oct. 25, 2016

(54) GRAPHENE BASE AND METHOD OF PREPARING THE SAME

(71) Applicant: Samsung Electronics Co., Ltd., Suwon-si, Gyeonggi-do (KR)

(72) Inventors: Hyeon-jin Shin, Suwon-si (KR); Won-mook Choi, Hwaseong-si (KR); Jae-young Choi, Suwon-si (KR); Seon-mi Yoon, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 216 days.

(21) Appl. No.: 14/288,913

(22) Filed: May 28, 2014

(65) Prior Publication Data

US 2014/0263166 A1    Sep. 18, 2014

Related U.S. Application Data

(62) Division of application No. 12/815,791, filed on Jun. 15, 2010, now Pat. No. 9,315,387.

(30) Foreign Application Priority Data

Aug. 5, 2009  (KR) .......................... 10-2009-0072116

(51) Int. Cl.
   *C01B 31/04*   (2006.01)
   *B82Y 30/00*   (2011.01)
   *B82Y 40/00*   (2011.01)
   (Continued)

(52) U.S. Cl.
   CPC ............ *C01B 31/0446* (2013.01); *B82Y 30/00* (2013.01); *B82Y 40/00* (2013.01); *C01B 31/0206* (2013.01); *C01B 31/0438* (2013.01); *C01B 31/0484* (2013.01); *H01J 1/304* (2013.01); *C01B 2204/22* (2013.01); *H01J 2201/30461* (2013.01); *H01J 2329/0449* (2013.01); *Y10T 428/24802* (2015.01); *Y10T 428/24851* (2015.01); *Y10T 428/265* (2015.01); *Y10T 428/30* (2015.01);
   (Continued)

(58) Field of Classification Search
   CPC .......... C01B 31/0446; C01B 31/0206; C01B 31/0438; C01B 31/0484; B82Y 30/00; B82Y 40/00
   See application file for complete search history.

(56) References Cited

U.S. PATENT DOCUMENTS

2008/0014426 A1   1/2008   Nishikawa et al.
2009/0061107 A1   3/2009   Sandhu
(Continued)

FOREIGN PATENT DOCUMENTS

EP    2055673 A1    5/2009
JP    2004-244309   9/2004
(Continued)

OTHER PUBLICATIONS

Kim, Keun Soo, et al. "Large-scale pattern growth of graphene films for stretchable transparent electrodes." Nature 457.7230 (2009): 706-710.*

(Continued)

*Primary Examiner* — Richard M Rump
(74) *Attorney, Agent, or Firm* — Cantor Colburn LLP

(57) ABSTRACT

A graphene base, including: graphene; and a substrate, wherein the graphene is formed directly on at least one surface of the substrate, and at least about 90 percent of an area of the surface of the substrate does not have a graphene wrinkle.

16 Claims, 6 Drawing Sheets

(51) Int. Cl.
  *C01B 31/02* (2006.01)
  *H01J 1/304* (2006.01)
(52) U.S. Cl.
  CPC . *Y10T 428/31678* (2015.04); *Y10T 428/31786* (2015.04)

(56) References Cited

U.S. PATENT DOCUMENTS

| | | |
|---|---|---|
| 2009/0068471 A1 | 3/2009 | Choi et al. |
| 2009/0324897 A1 | 12/2009 | Choi |
| 2010/0255984 A1 | 10/2010 | Sutter |
| 2012/0168724 A1 | 7/2012 | Park et al. |

FOREIGN PATENT DOCUMENTS

| | | |
|---|---|---|
| JP | 20080-050228 A | 3/2008 |
| KR | 1020090026568 A | 3/2009 |
| KR | 1020090029621 A | 3/2009 |
| WO | 2008097343 A3 | 8/2008 |
| WO | 2009035213 A1 | 3/2009 |

OTHER PUBLICATIONS

Hofrichter, Jens, et al. "Synthesis of graphene on silicon dioxide by a solid carbon source." Nano letters 10.1 (2009): 36-42.*
Wei, et al., Synthesis of N-Doped Graphene by Chemical Vapor Deposition and Its Electrical Properties, Nano Letters, vol. 9, No. 5, 2009, pp. 1752-1758.
European Search Report for Application No. 10170302.3-1218/2281779 dated Nov. 7, 2011.
Juang, et al., Synthesis of graphene on silicon carbide substrates at low temperature, Carbon, Elsevier, Oxford, GB, vol. 47, No. 8, Jul. 1, 2009 pp. 2026-2031, XP026104606.
Yu, et al., Graphene Segregated on Ni surfaces and Transferred to Insulators, Internet Citation, Apr. 17, 2008 pp. 1-11, XP002630018.
Koren Office Action with English Translation for Application No. 10-2009-0072116 dated Jun. 26, 2015.
Sutter, Peter, How silicon leaves the scene, Nature Materials, Mar. 2009, vol. 8, pp. 171-172.

* cited by examiner

GRAPHENE BASE AND METHOD OF PREPARING THE SAME

CROSS-REFERENCE TO RELATED APPLICATIONS

This application is a divisional of U.S. application Ser. No. 12/815,791, filed on Jun. 15, 2010, which claims priority to Korean Patent Application No. 10-2009-0072116, filed on Aug. 5, 2009, and all the benefits accruing therefrom under U.S.C. §119, the content of which in its entirety is herein incorporated by reference.

BACKGROUND

1. Field

The present disclosure relates to a graphene base and a method of preparing the same, and more particularly, a graphene base wherein graphene is formed on a substrate in a selected shape, and methods of easily preparing the graphene base.

2. Description of the Related Art

Generally, graphite is an allotropic form of the element carbon having a structure in which two-dimensional ("2D") graphene sheets are stacked. There are two allotropic forms with different stacking arrangements, hexagonal and rhombohedral. The carbon atoms of the graphene sheets are connected to each other in an extended array of hexagonal rings. Recently, one or more graphene sheets were removed from the graphite to study the characteristics of a single graphene sheet, and it was observed that graphene sheet provides very useful characteristics as compared to existing materials.

The electrical characteristics of a graphene sheet are dependent upon a crystallographic orientation of the graphene sheet. Accordingly, the electrical characteristics of a graphene sheet may be selected, and thus a device can be easily designed. Accordingly, a graphene sheet may be effectively used in a carbon-based electrical device or a carbon-based electromagnetic device.

However, it is difficult to prepare the graphene sheet. Further, it is even more difficult to form the graphene sheet on a base, wherein a base is a substrate suitable for a device, which may be distinct from a substrate suitable for forming a graphene sheet. Accordingly, there remains a need in the art for devices and methods which can provide a graphene sheet on a base suitable for use in an electrical or electromagnetic device.

SUMMARY

Provided is graphene base in which graphene is formed on a substrate in a selected shape.

Also provided is a method of preparing the graphene base.

Additional aspects will be set forth in part in the description which follows.

According to an aspect, a graphene base includes graphene; and a substrate, wherein the graphene is formed directly on at least one surface of the substrate, and at least about 90 percent of an area of the graphene does not have a wrinkle.

A ratio of a peak D-band intensity to a peak G-band intensity of the graphene is equal to or less than about 0.5 in a Raman spectrum of the graphene. In another embodiment, the ratio may be equal to or less than about 0.2.

A length of at least one side of the graphene may be equal to or greater than about 1 millimeter.

The graphene may have a patterned shape.

The graphene base may further include a graphitization catalyst layer on the graphene.

The substrate may be a silicon substrate on which an oxide layer is disposed.

The graphitization catalyst layer may include at least one selected from the group consisting of nickel, cobalt, iron, platinum, gold, aluminum, chromium, copper, magnesium, Manganese, molybdenum, rhodium, silicon, thallium, titanium, tungsten, uranium, vanadium, zirconium, ruthenium, and iridium.

A thickness of the graphitization catalyst layer may be about 1 nanometer to about 1 micrometer.

A pattern layer may be disposed on the at least one surface of the substrate before the graphene is formed on the substrate.

The graphene may be formed according to a shape of the pattern layer on the substrate.

According to another aspect, disclosed is a method of preparing a graphene base, the method includes: disposing a carbon-based material on at least one surface of a substrate; disposing a graphitization catalyst layer on the carbon-based material; and forming graphene by thermally treating the substrate, the carbon-based material and the graphitization catalyst layer under an inert atmosphere or a reducing atmosphere.

The carbon-based material may be at least one selected from the group consisting of a carbon-containing polymer, a gaseous carbon-based material, amorphous carbon, and an organometallic compound.

The method may further include patterning the carbon-based material on the substrate.

The method may further include patterning the graphitization catalyst layer on the substrate.

The method may further include forming a ceramic layer on the graphitization catalyst layer; and patterning the ceramic layer.

The graphene may have a patterned shape.

The substrate may be a silicon substrate on which an oxide layer is disposed.

The graphitization catalyst layer may include at least one selected from the group consisting of nickel, cobalt, iron, platinum, gold, aluminum, chromium, copper, magnesium, manganese, molybdenum, rhodium, silicon, thallium, titanium, tungsten, uranium, vanadium, zirconium, ruthenium, and iridium.

A thickness of the graphitization catalyst layer may be about 1 nanometer to about 1 micrometer.

The method may further include removing the graphitization catalyst layer by acid-treatment, after the forming of the graphene.

The method may further include forming a pattern on the graphitization catalyst layer by selectively removing a portion of the graphitization catalyst layer.

A pattern layer may be disposed on one surface of the substrate before the disposing of the carbon-based material on the substrate.

The graphene may have a shape which is the same as a shape of the pattern layer.

Also disclosed is an electrical device, including: a graphene base, the graphene base including graphene; and a substrate, wherein the graphene is formed directly on at least one surface of the substrate, and at least about 90 percent of an area of the graphene does not have a wrinkle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
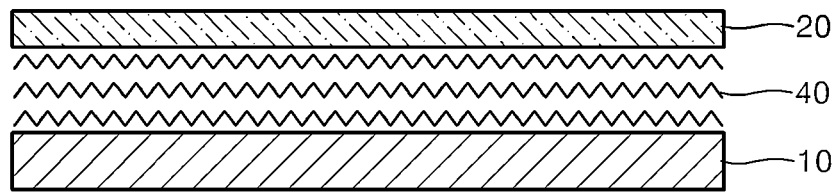
FIG. 1 is a schematic diagram illustrating an exemplary embodiment of a graphene base.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects, features, and advantages of the present description. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A graphene base according to an embodiment includes graphene formed on at least one surface of a substrate.

The term "graphene" as used herein refers to a polycyclic aromatic molecule comprising a plurality of carbon atoms connected to each other by a covalent bond. The plurality of carbon atoms may form six rings as a standard repeating unit, or may further include 5 rings and/or 7 rings. Accordingly, the graphene may be a single layer of covalently bonded carbon atoms having generally $sp^2$ hybridization. A plurality of graphene layers is often referred to in the art as graphite. However, for convenience, "graphene," as used herein, may comprise one or more layers of graphene. Thus, as used herein, graphene may refer to a single layer of carbon, or also may refer to a plurality of layers of stacked single layers of graphene. The maximum thickness of graphene is 100 nm.

In an embodiment, the graphene base comprises graphene on a substrate, and the number of layers of graphene formed on the substrate may be about 1 to about 300, specifically about 2 to about 250, more specifically about 3 to about 200. Within the foregoing range, the electrical characteristics of the graphene are maintained.

The substrate and the graphene may be directly combined with each other chemically and/or physically. In an embodiment, the graphene is chemically bonded to the substrate. In another embodiment the graphene is bound to the substrate by a covalent bond. In an embodiment, graphene is grown in-situ on the substrate. While not wanting to be bound by theory, it is understood that growing graphene in-situ on the substrate results in a stronger bond between the substrate and the graphene than results from other methods of disposing graphene on a substrate, such as a method wherein graphene is formed separately and then transferred to (e.g., disposed on) the substrate. More specifically, it is also understood that because the graphene is grown in-situ on the substrate, graphene wrinkles that are generated during a transferring process are substantially reduced or effectively prevented from occurring. The graphene wrinkles may include a crystallographic defect, such as a dislocation. For example, in the graphene base, wrinkles do not exist in at least about 90 percent (%), specifically at least about 95%, more specifically at least about 99% of an area of a surface of the substrate. In another embodiment, at least about 90%, specifically at least about 95%, more specifically at least about 99% of the graphene does not comprise a wrinkle. In another embodiment, a content of defects in the graphene may be equal to or less than about 10%, specifically equal to or less than about 5%, more specifically equal to or less than about 1%.

Evenness and the content of defects in the graphene may be determined by Raman spectroscopy, specifically through the existence or intensity of a D-band in the Raman spectrum. While not wanting to be bound by theory, it is understood that the intensity of the Raman D-band correlates to flaws in the texture of the graphene. Thus when the peak intensity of the D-band is high, it is understood that the graphene includes many flaws, and when the peak intensity of the D-band is low, or the D-band is not observed or does not exist, it is understood that the graphene has few flaws or does not have any flaws.

A ratio of the peak intensity of the D-band to the G-band of the graphene of the graphene base may be equal to or less than about 0.5, specifically equal to or less than about 0.2, more specifically equal to or less than about 0.1. For example, the ratio of the peak intensity of the D-band to the G-band of the graphene may be equal to or less than about 0.01, specifically equal to or less than about 0.001, more specifically zero, which indicates that the graphene has a substantially perfect (e.g., defect free) texture.

In another embodiment, a ratio of an area of the D-band peak to an area of the G-band peak of the graphene of the graphene base may be equal to or less than about 0.5, specifically equal to or less than about 0.2, more specifically equal to or less than about 0.1. For example, the ratio of the peak area of the D-band to the G-band of the graphene may be equal to or less than about 0.01, specifically equal to or less than about 0.001, more specifically zero, which indicates that the graphene has a substantially perfect texture.

The graphene may have a same shape as the substrate, and the shape of the graphene is not limited thereto. The graphene may have a patterned shape. In an embodiment, the graphene may have a linear shape, such as the shape of a line in an electronic circuit, a circular shape, an oval shape, a rectangular shape, a rectilinear shape or a combination thereof. Also, a plurality of layers of graphene may be formed on the substrate.

A graphitization catalyst layer may be further formed (e.g., disposed) on the graphene which is formed on the at least one surface of the substrate. FIG. 1 is a schematic diagram illustrating an exemplary embodiment of a graphene base. As shown in FIG. 1, graphene 40 is formed on a substrate 10, and a graphitization catalyst layer 20 is formed on the graphene 40. The graphitization catalyst layer 20 may have a same pattern or shape as that of the graphene 40, or may have the same shape as a shape of the substrate 10 and not have a pattern.

The graphitization catalyst layer 20 may comprise a catalyst which is used to synthesize graphite, induce a carbonization reaction, or prepare a carbon nanotube. For example, the graphitization metal catalyst may comprise at least one metal selected from the group consisting of nickel (Ni), cobalt (Co), iron (Fe), platinum (Pt), gold (Au), aluminium (Al), chromium (Cr), copper (Cu), magnesium (Mg), manganese (Mn), molybdenum (Mo), rhodium (Rh), silicon (Si), thallium (Ta), titanium (Ti), tungsten (W), uranium (U), vanadium (V), zirconium (Zr), ruthenium (Ru), and iridium (Ir).

The substrate 10 on which the graphene 40 is formed is not specifically limited, and may be an inorganic substrate. The substrate may be a silicon substrate, a glass substrate, or a gallium nitride (GaN) substrate. In another embodiment, the substrate may be a plastic substrate, such as a polyethylene terephthalate ("PET") substrate, a polyester sulfone ("PES") substrate, or a polyethylene naphthalate ("PEN") substrate. In another embodiment the substrate may be a metal substrate, such as a Ni substrate, a Cu substrate, a W substrate, a Fe substrate, or a Co substrate. A selected oxide layer, such as a silica layer, may be formed (e.g., disposed) on the substrate 10, and a thickness of the oxide layer may be about 1 nanometer (nm) to about 1,000 nm, specifically about 10 nm to about 500 nm, more specifically about 20 nm to about 100 nm. In an embodiment, the substrate may comprise silicon, a glass, gallium nitride, a plastic, polyethylene terephthalate, polyester sulfone, polyethylene napthalate, Ni, Cu, W, Fe, Co, silica, or a combination thereof.

A pattern may be pre-formed (e.g., disposed) on the substrate 10. The pattern may be formed (e.g., disposed) using the same material as the substrate 10, or by using a ceramic layer. In an embodiment, the ceramic layer may comprise an oxide, a carbide, a boride, a nitride, or a silicide. In another embodiment, the ceramic layer is an oxide layer. When the graphene 40 is formed on the substrate 10 having the pattern, the graphene 40 is formed to have a shape which is the same as a shape of the pattern, and thus the graphene base may be used without a separate pattern forming process while forming a device.

The graphene base may be formed as follows.

Figure 2:
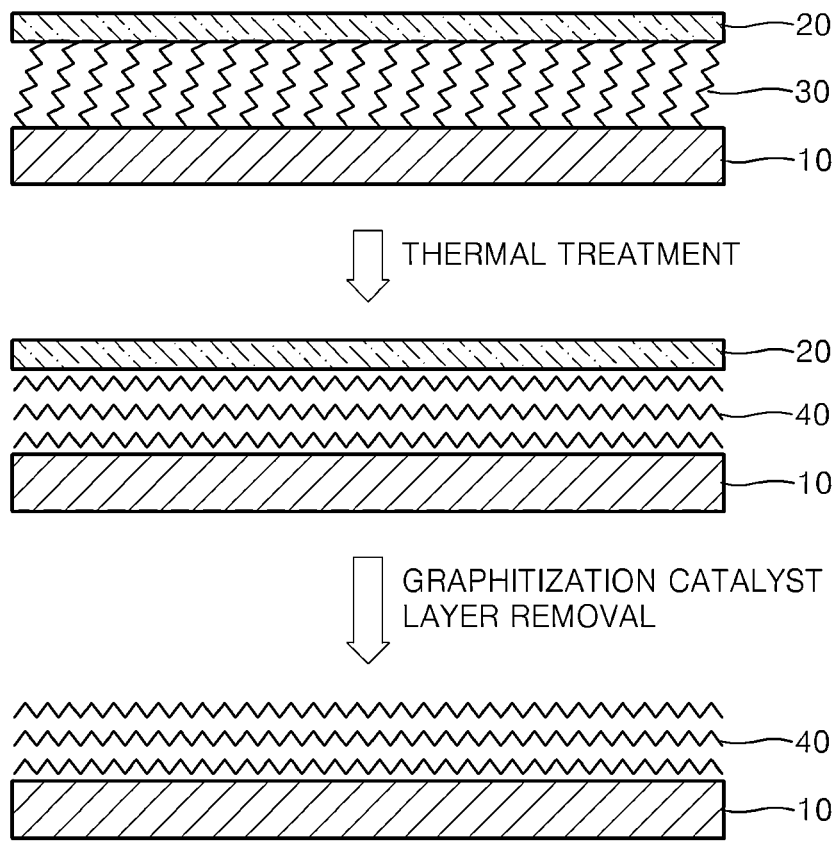
FIG. 2 is a diagram of an exemplary embodiment of a method of preparing a graphene base.

FIG. 2 is a diagram describing an exemplary embodiment of a method of preparing a graphene base. As shown in FIG. 2, a carbon-based material 30 is combined with (e.g., disposed on) at least one surface of the substrate 10, and then the graphitization catalyst layer 20 is formed (e.g., disposed) on the carbon-based material 30. The substrate 10 on which the carbon-based material 30 and the graphitization catalyst layer 20 are formed (e.g., disposed) is thermally treated under an inert atmosphere or a reducing atmosphere so as to form the graphene 40 between the substrate 10 and the graphitization catalyst layer 20.

It is possible to provide a graphene base having only the graphene 40 on the substrate 10 by removing the graphitization catalyst layer 20, by a method including an acid-treatment, for example, after thermally treating the substrate 10.

Examples of the carbon-based material 30 used as a carbon source for forming the graphene 40 in the disclosed method include a carbon-containing polymer, a gaseous carbon-based material, amorphous carbon, an organometallic compound, or a combination comprising at least one of the foregoing, but are not limited thereto.

When the carbon-based material 30 is formed (e.g., disposed) on the substrate 10, the carbon-based material 30 may be formed (e.g., disposed) on the entire substrate 10, or disposed on the substrate 10 in a selected pattern or shape. For example, the carbon-based material 30 may be formed on the entire surface of the substrate 10, and then selectively etched by using a mask. When the carbon-based material 30 is formed (e.g., disposed) on the substrate 10 in the selected pattern or shape, the graphene 40 formed therefrom has a pattern or shape which is similar to the selected pattern or shape.

The carbon-based material 30 may be combined (e.g., disposed) on the substrate 10 by any one of coating a carbon-containing polymer on the substrate 10; contacting a gaseous carbon-based material with the substrate 10; forming amorphous carbon on the substrate 10 by a coating method such as spin coating or bar coating; and forming (e.g., disposing) an organometallic compound on the substrate 10 by a coating method such as spin coating or bar coating.

After forming (e.g., disposing) the carbon-based material 30 on the substrate 10, the graphitization catalyst layer 20 is formed (e.g., disposed) on the carbon-based material 30. The graphitization catalyst layer 20 helps carbon components in the carbon-based material 30 combine with each other and form a hexagonal plate structure, and thus may catalyze the formation of graphene from the carbon-based material 30. As described above, the graphitization catalyst layer 20 may comprise at least one metal selected from the group consisting of Ni, Co, Fe, Pt, Au, Al, Cr, Cu, Mg, Mn, Mo, Rh, Si, Ta, Ti, W, U, V, Zr, Ru, and Ir.

A thickness of the graphitization catalyst layer 20 may be about 1 nanometer (nm) to about 1 micrometer (µm), specifically about 10 nm to about 500 nm, more specifically about 20 nm to about 200 nm. While not wanting to be bound by theory, it is understood that during the forming of the graphene 40, carbon is diffused in and out from the graphitization catalyst layer 20, and specifically, the graphene 40 is grown when the entire carbon supply source is provided on the substrate 10, instead of growing the graphene 40 while continuously supplying the carbon supply source. Accordingly, the thickness of the graphitization catalyst layer 20 affects the forming of the graphene 40. Thus, the number of layers of the graphene 40 may be controlled by selecting a suitable thickness of the graphitization catalyst layer 20.

The substrate 10 is not specifically limited, and may be an inorganic substrate, such as a silicon substrate, a glass substrate, or a GaN substrate, or a plastic substrate, such as a PET substrate, a PES substrate, or a PEN substrate, or a metal substrate, such as a Ni substrate, a Cu substrate, a W substrate, a Fe substrate, or a Co substrate. A selected oxide layer, such as a silica layer, may be formed (e.g., disposed) on the substrate 10, and a thickness of the oxide layer may be from about 1 nm to about 1,000 nm, specifically about 5 nm to about 500 nm, more specifically about 10 nm to about 250 nm.

The substrate 10 may be prepared in a shape according to a shape of the graphene 40 to be formed thereon, and may have a circular shape, an oval shape, a polyhedral shape, or combination thereof. Specifically, it is possible to form the graphene 40 to have a large area, and thus a length of at least one side of the substrate 10 may be equal to or greater than 1 millimeter (mm), specifically equal to or greater than 2 mm, more specifically equal to or greater than 10 mm. Thus the graphene may have at least one dimension equal to or greater than 1 mm, specifically equal to or greater than 2 mm, more specifically equal to or greater than 10 mm. As used herein, the length of the one side may be a length in a longitudinal or a lateral direction. Thus the length of the one side may differ according to a type of polyhedral shape. The length may be a diameter of a circular shape, a longest dimension of an oval shape, or a length in a longitudinal direction of a polyhedral shape. In another embodiment, the length may be the shortest length of an oval shape or a length in a lateral direction of a polyhedral shape.

In an embodiment of the disclosed method, the graphitization catalyst layer 20 may be formed on the substrate 10 using a metal coating method, such as a chemical vapor deposition ("CVD"), a physical vapor deposition ("PVD") method, such as sputtering, or an atomic layer deposition ("ALD") method. For example, the graphitization catalyst layer 20 may be printed in a selected shape on the substrate 10 on which the carbon-based material 30 is formed, using a printing method, or a highly precise pattern or shape may be formed on the graphitization catalyst layer 20 by using a photolithography process. The graphitization catalyst layer 20 may be patterned using photolithography by, for example, disposing a graphitization catalyst on an entire surface of the substrate 10, forming a photoresist layer on the graphitization catalyst, adhering a photomask to the photoresist layer, and then forming the highly precise pattern or shape on the graphitization catalyst layer 20 using a light exposure and etching process. As such, when the graphitization catalyst layer 20 is patterned, the carbon-based material 30 contacting the patterned graphitization catalyst is substantially or completely graphitized, and thus it is possible to pattern the graphene 40 on the substrate 10 in a selected shape.

Figure 3:
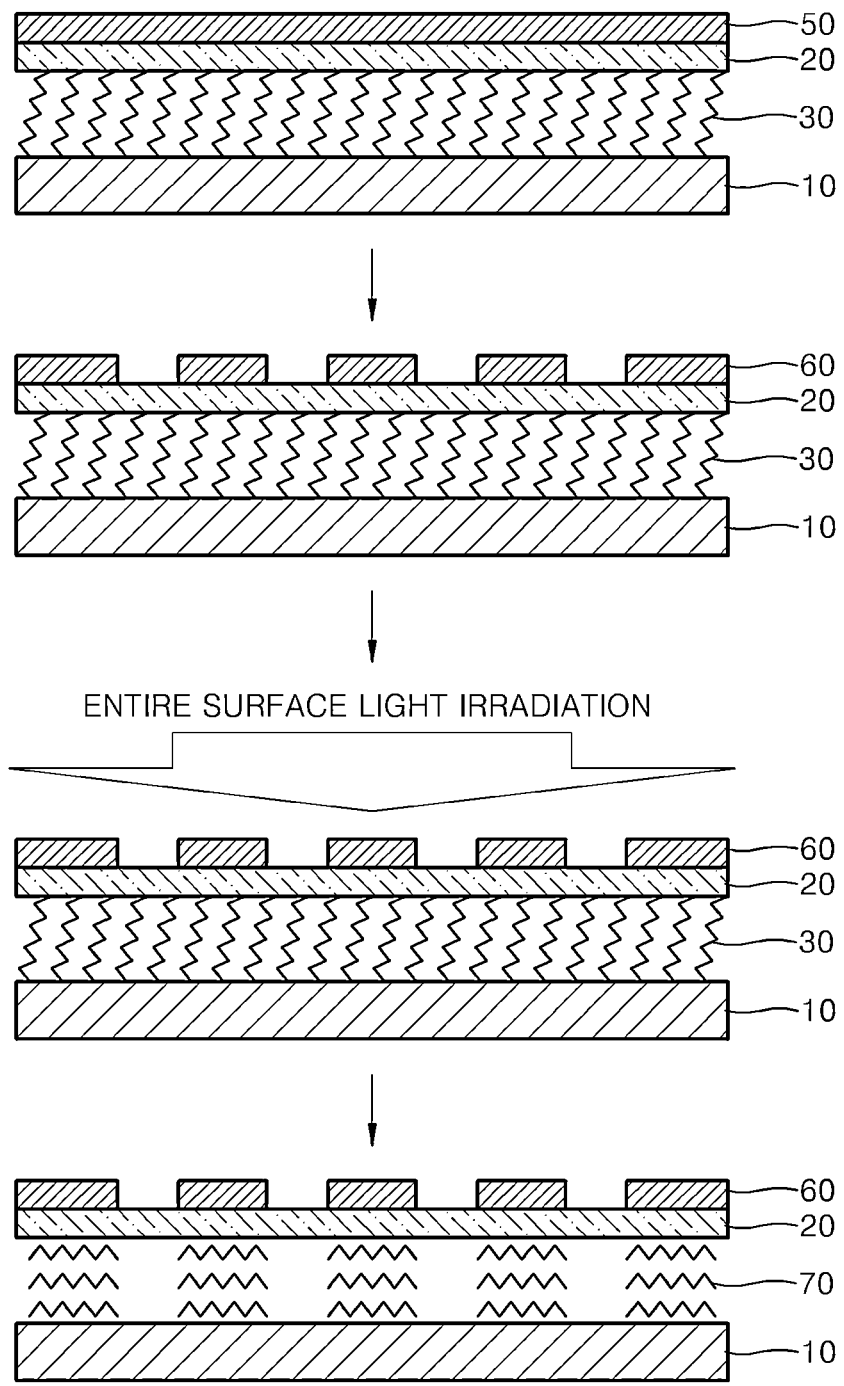
FIG. 3 is a diagram of another exemplary embodiment of a method of preparing a patterned graphene base.

Alternatively, the patterned graphene base may be formed by forming (e.g., disposing) the graphitization catalyst layer 20 on an entire surface of the carbon-based material 30, and forming (e.g., disposing) and patterning a ceramic layer on the graphitization catalyst layer 20. In an embodiment, the ceramic layer may comprise an oxide, a carbide, a boride, a nitride, or a silicide. In another embodiment, the ceramic layer is an oxide layer. FIG. 3 is a diagram describing another exemplary embodiment of a method of preparing a patterned graphene base. As shown in FIG. 3, the carbon-based material 30 is formed on the substrate 10, and then the graphitization catalyst layer 20 is formed (e.g., disposed) on an entire surface of the carbon-based material 30. Then, a ceramic layer 50 is formed (e.g., disposed) on the graphitization catalyst layer 20, and then a patterned ceramic layer 60 is formed using the photoresist method, or the like, as further described above. Next, a thermal treatment process is performed. For example, the carbon-based material 30 may be selectively graphitized by performing light irradiation on an entire surface of the patterned ceramic layer 60. In an embodiment, when the patterned ceramic layer 60 is irradiated with light, the light is directly irradiated on the graphitization catalyst layer 20 and also is directly irradiated on the patterned ceramic layer 60. Accordingly, the carbon-based material 30 below the graphitization catalyst layer 20, which directly receives light, is substantially or entirely graphitized due to a difference between the thermal-conductivity of the graphitization catalyst layer 20 and the patterned ceramic layer 60. Thus, patterned graphene 70 is formed on the substrate 10.

The ceramic layer 50 may comprise an aluminum oxide (e.g., $Al_2O_3$), a magnesium oxide (e.g., MgO), a sodium oxide (e.g., $Na_2O$), a zinc oxide (e.g., ZnO), or a combination comprising at least one of the foregoing. In another embodiment, and the ceramic layer 50 may comprise silica, a silicon nitride (e.g., SiN), a hafnium dioxide (e.g., $HfO_2$), or a combination comprising at least one of the foregoing. The ceramic layer 50 may be formed using a CVD method, a PVD method, a liquid method, or a coating method using a precursor. A thickness of the ceramic layer 50 may be from about 1 nm to about 1,000 nm, specifically about 2 nm to about 500 nm, more specifically from about 4 nm to about 250 nm.

A structure or a composition of the carbon-based material 30 combined on the substrate 10 is not limited so long as the carbon-based material 30 comprises carbon. In an embodiment, to facilitate forming dense patterned graphene 70, the density of the coated carbon-based material 30 may be increased. A carbon-based material 30 having increased density may comprise an aromatic material, a linear alky material, a carbon-containing polymer, a gaseous carbon-based material, amorphous carbon, an organometallic compound, or a combination comprising at least one of the foregoing. In another embodiment, a carbon-based material 30 having increased density may be an aromatic material, a linear alky material, a carbon-containing polymer, a gaseous carbon-based material, amorphous carbon, an organometallic compound, or a combination comprising at least one of the foregoing.

The aromatic material may comprise a pentacene, a phenyl trichlorosilane, an anthracenyl trichlorosilane, or phthalocyanyl trichlorosilane. The linear alkyl material may comprise a propyl trichlorosilane, a hexyl trichlorosilane, an octyl trichlorosilane, an octadecyl trichlorosilane. The carbon-containing polymer may comprise a poly methyl-metacrylate (PMMA), poly acrylonitrile (PAN), or poly imides (PI). The amorphous carbon may comprise a graphite oxide, but is not limited thereto. The organometallic compound may be a phtalocyanide based compound, a porphyrin based compound, or a metallocene, such as cobaltocene, nickelocene, chromocene, bis(benzene)chromium, and ferrocene. In another embodiment, the organometallic compound may comprise a metallocene, such as cobaltocene, nickelocene, chromocene, bis(benzene)chromium, ferrocene, or a combination comprising at least one of the foregoing. The carbon-based material 30 may be formed (e.g., disposed) using a spin coating method or a bar coating method.

Any carbon-containing polymer may be used as the carbon-based material 30, and when a self-assembled polymer is used, the self-assembled polymer may be regularly arranged in a perpendicular direction on the substrate 10, and thus the patterned graphene 70, which has a high density, may be formed.

The self-assembled polymer, which forms a self-assembled layer, may be at least one self-assembled polymer selected from the group consisting of an amphiphilic polymer, a liquid crystal polymer, a conductive polymer, and a combination comprising at least one of the foregoing.

Because the amphiphilic polymer has both hydrophilic and hydrophobic functional groups in a structure thereof, the amphiphilic polymer may be arranged in a uniform arrangement, such as a Langmuir-Blodgett arrangement, a dipping arrangement, or a spin arrangement, in an aqueous solution. The amphiphilic polymer includes a hydrophilic functional group including at least one selected from the group consisting of an amino group, a hydroxyl group, a carboxyl group, a sulfate group, a sulfonate group, a phosphate group, a salt thereof, and a combination comprising at least one of the foregoing; and a hydrophobic functional group including at least one selected from the group consisting of a halogen atom, a $C_1$-$C_{30}$ alkyl group, a $C_1$-$C_{30}$ halogenated alkyl group, a $C_2$-$C_{30}$ alkenyl group, a $C_2$-$C_{30}$ halogenated alkenyl group, a $C_2$-$C_{30}$ alkynyl group, a $C_2$-$C_{30}$ halogenated alkynyl group, a $C_1$-$C_{30}$ alkoxy group, a $C_1$-$C_{30}$ halogenated alkoxy group, a $C_1$-$C_{30}$ heteroalkyl group, a $C_1$-$C_{30}$ halogenated heteroalkyl group, a $C_6$-$C_{30}$ aryl group, a $C_6$-$C_{30}$ halogenated aryl group, a $C_7$-$C_{30}$ arylalkyl group, a $C_7$-$C_{30}$ halogenated arylalkyl group, and a combination comprising at least one of the foregoing. Examples of the amphiphilic polymer include a decanoic acid, a lauric acid, a palmitic acid, a stearic acid, a myristoleic acid, a palmitoleic acid, an oleic acid, a stearidonic acid, a linolenic acid, a caprylamine, a laurylamine, a stearylamine, an oleylamine, or a combination comprising at least one of the foregoing.

The liquid crystal polymer is arranged in a uniform alignment in a liquid crystal, and the conductive polymer forms a certain crystalline structure by forming a layer after being dissolved in a solvent and then self-assembling when the solvent volatilizes. Accordingly, the liquid crystal polymer and the conductive polymer may be arranged by a method including dipping, spin coating, or the like. Examples of the liquid crystal polymer and the conductive polymer include a polyacetylene-based polymer, a polypyrrole-based polymer, a polythiophene-based polymer, a polyaniline-based polymer, a polyfluoro-based polymer, a poly(3-hexylthiophene)-based polymer, a polynaphthalene-based polymer, a poly(p-phenylene sulfide)-based polymer, a poly(p-phenylene vinylene)-based polymer, or a combination comprising at least one of the foregoing.

In an embodiment, a polymer which self-arranges in a uniform alignment when deposited from a gaseous raw material, such as a conductive polymer which is formed via a deposition process, may be used. Examples of such a polymer include acene or derivatives thereof, anthracene or derivatives thereof, heteroanthracene (such as benzodithiophene or dithienothiophene) or derivatives thereof, tetracene or derivatives thereof (such as halogenated tetracene, a tetracene derivative having a polar substituent, a tetracene-thiophene hybrid material, tetracene-thiophene copolymer, rubrene, alkyl-substituted tetracene or alkoxy-substituted tetracene), heterotetracene or derivatives thereof, pentacene or derivatives thereof (such as alkyl-substituted or halogen-substituted pentacene, aryl-substituted pentacene, alkynyl-substituted pentacene, alkynyl-substituted alkyl pentacene, alkynyl-substituted alkynyl pentacene, or alkynyl-substituted pentacene ether), heteropentacene or derivatives thereof, or heteroacene or derivatives thereof, or a combination comprising at least one of the foregoing.

The carbon-containing polymer may include at least one polymerizable functional group, such as a carbon-carbon double bond or carbon-carbon triple bond, in a structure thereof. The at least one polymerizable functional group may enable polymerization between polymers (e.g., cross-linking) through a polymerization process, such as ultraviolet light irradiation, after forming a layer thereof. The carbon-based material 30 obtained therefrom may contain a large amount of cross-linking, and thus may substantially reduce or effectively prevent carbon from being volatized during thermal treatment.

Such a carbon-containing polymer may be polymerized before or after being coated on the substrate 10. In an embodiment, when the carbon-containing polymer is polymerized before being coated on the substrate 10, a polymerization layer obtained through a separate polymerization process may be transferred on the substrate 10 so as to obtain the carbon-based material 30. Such a polymerization process and a transferring process may be repeated a plurality of times so as to obtain the patterned graphene 70 having a desired thickness.

The carbon-containing polymer may be arranged on the graphitization catalyst by any suitable method. For example, the carbon-containing polymer may be arranged on a surface of the graphitization catalyst using a Langmuir-Blodgett method, a dip coating method, a spin coating method, a bar coating method, or a vacuum-deposition method. Through such a coating method, the carbon-containing polymer may be coated on a portion of or an entire surface of the substrate 10.

When the carbon-containing polymer is selectively coated on the substrate 10, the carbon-containing polymer has a pattern or a shape. Even when the carbon-containing polymer is coated on an entire surface of the substrate 10, the carbon-containing polymer which is coated on an area without the graphitization catalyst turns into a gas or amorphous carbon by thermally decomposing during the thermal treatment process. The amorphous carbon may be selectively removed in a subsequent process.

In an embodiment, the amount of the carbon-containing polymer, the thickness of a layer, or the number of self-assembled layers of the carbon-containing polymer arranged on the substrate 10 may be selected according to the desired number of layers of the patterned graphene 70. In an embodiment, when the carbon-containing polymer having a high degree of cross-linking is used, the amount of carbon is high, and thus the number of layers of the patterned graphene 70 is also high. Also, when the thickness of the carbon supply source is increased, the number of layers of the patterned graphene 70 increases, and thus the thickness of the patterned graphene 70 increases. The thickness of the patterned graphene 70 may be selected according to the amount of the carbon-containing polymer.

An amphiphilic organic material may be a self-assembled organic material and include both a hydrophilic portion and a hydrophobic portion in a molecule thereof. The hydrophobic portion may be evenly arranged on the substrate by first contacting it with the substrate 10, which is hydrophobic, and the hydrophilic portion of the amphiphilic organic material may then be exposed in a direction away from the substrate 10, and thus may be contacted with a hydrophobic portion of another amphiphilic organic material, such as an amphiphilic polymer, which does not contact the substrate 10. When the amount of the amphiphilic organic material is sufficient, the amphiphilic organic material may sequentially stack on the substrate 10 according to a hydrophilic-hydrophobic bond. The amphiphilic organic materials combine with each other to form a plurality of layers, and then form the patterned graphene 70 through the thermal treatment. Accordingly, by selecting a suitable amphiphilic organic material, and selecting a thickness of layers of the amphiphilic organic material by selecting the amount of the amphiphilic organic material, the number of layers of the patterned graphene 70 may be selected. Thus, the patterned graphene 70 having a desired thickness may be prepared.

After the carbon-based material 30, such as the carbon-containing polymer, the gaseous carbon-based material, the amorphous carbon, the organometallic compound, or a combination comprising at least one of the foregoing is combined with the graphitization catalyst layer 20, the carbon-based material 30 is thermally treated so that the carbon-based material 30 is graphitized. The thermal treatment is performed under an inert atmosphere or a reducing atmosphere in order to substantially reduce or effectively prevent components which form the carbon-based material 30 from being oxidized. Carbon components of the carbon-based material 30 combine with each other in the thermal treatment, and thus the patterned graphene 70, which has a hexagonal plate-like structure, is formed on the substrate 10.

The thermal treatment may be performed at a temperature of about 400° C. to about 2,000° C., specifically about 500° C. to about 1800° C., more specifically about 600° C. to about 1600° C. When the temperature is below about 400° C., sufficient graphitization may not occur, and when the temperature is above about 2,000° C., carbon may volatize. The thermal treatment may be performed for a time of about 1 second to about 12 hours, specifically about 1 minute to about 10 hours, more specifically about 30 minutes to about 6 hours. When the time is less than 1 second, sufficient graphitization may not occur, and when the time is greater than 12 hours, economic efficiency may deteriorate.

A heat source for the thermal treatment is not limited, and may include induction heat, radiant heat, a laser, infrared ("IR") heat, a microwave, plasma, ultraviolet ("UV") rays, or surface plasmon heat.

A selected cooling process is performed on the resulting product obtained after the thermal treatment. The cooling process is performed so that the patterned graphene 70 is grown and arranged uniformly. Because sudden cooling may generate cracks in the patterned graphene 70, the resulting product may be slowly cooled at a uniform rate. For example, the resulting product may be cooled at a rate from about 0.1° C. to about 10° C. per minute, specifically about 1° C. to about 9° C. per minutes, more specifically about 5° C. per minute, or may be cooled naturally (e.g., by ambient convection). The cooling of the resulting product naturally is performed by simply removing the heat source used for the thermal treatment, and by removing only the heat source, a sufficient cooling rate may be obtained.

According to the foregoing method, the patterned graphene 70 may be obtained by forming a pattern or a shape on the carbon-based material 30. Alternatively, a patterning may be performed directly on the graphitization catalyst layer 20. In an embodiment, the carbon-based material 30 may be formed (e.g. disposed) on an entire surface of the substrate 10, and the graphitization catalyst layer 20 may be formed (e.g., disposed) to have a selected pattern without patterning the carbon-based material 30.

By forming the patterned graphene 70 as described above, the patterned graphene 70 and the graphitization catalyst layer 20 are sequentially formed on at least one surface of the substrate 10. The graphitization catalyst layer 20 may be used as is, or may be removed through an acid-treatment if desired so that the patterned graphene 70 is directly combined with the substrate 10. The graphitization catalyst layer 20 may be entirely removed, or selectively removed when the graphitization catalyst layer 20 is to be patterned. For example, a desired pattern may be formed on the graphitization catalyst layer 20 through a photoresist process, and then the graphitization catalyst layer 20 may be patterned and left on the graphene base by protecting a part of the graphitization catalyst layer 20 and removing the exposed graphitization catalyst layer 20 through an acid-treatment.

According to the above process, the patterned graphene 70 is directly formed on the substrate 10, and thus when the substrate 10 is selected to initially have a structure or shape of a desired device, the substrate 10 may be directly applied to various devices without an additional transferring process. When the patterned graphene 70 in a selected pattern is formed on the substrate 10 selected to have the structure of a desired device, an interface problem that may occur while transferring the patterned graphene 70 is substantially reduced or effectively prevented. Moreover, the patterned graphene 70 formed directly on the substrate 10 has a remarkably low number of wrinkles or defects, and thus the patterned graphene 70 having a perfect or substantially perfect structure may be formed.

The graphene base obtained as above may be effectively used in various display devices, such as a field emission displays ("FED"), a liquid crystal display ("LCD"), or an organic light emitting device ("OLED"), or various electrical devices, such as a super-capacitor, a fuel cell, or a solar cell, or various nano-devices, such as a field-effect transistors ("FET"), or a memory device, a transparent electrode, a hydrogen storage device, an optical fiber, or another electrical device.

The disclosed embodiments will be described in further detail with reference to the following examples. The following examples are for illustrative purposes only and are not intended to limit the scope of the invention.

Example 1

A 3 centimeter (cm) by 3 cm silicon substrate coated with 100 nm of silicon dioxide ($SiO_2$) was processed with ultraviolet/ozone ("UV/$O_3$") for 30 minutes, and then impregnated for 20 minutes in a 50 millimolar (mM) octadecyl trichlorosilane in hexane solution under a nitrogen atmosphere. Next, the silicon substrate was removed from the octadecyl trichlorosilane hexane solution, the residue thereof was cleaned with hexane, and then the silicon substrate was baked for 20 minutes at a temperature of 120° C. The silicon substrate was put into a toluene solution and then processed for 3 minutes with ultrasonic waves so as to remove materials aggregated on the surface of the silicon substrate. Accordingly, a single layer of a self-assembled layer was obtained.

Then, a 300 nm thick nickel layer was formed on the silicon substrate by depositing nickel using thermal-evaporation.

The silicon substrate, on which octadecyl chlorosilane and the nickel layer are formed, was thermally-treated in a furnace for 1 hour at a temperature of 900° C. under a nitrogen atmosphere so as to form graphene on the silicon substrate, thereby preparing a graphene base.

Figure 4:
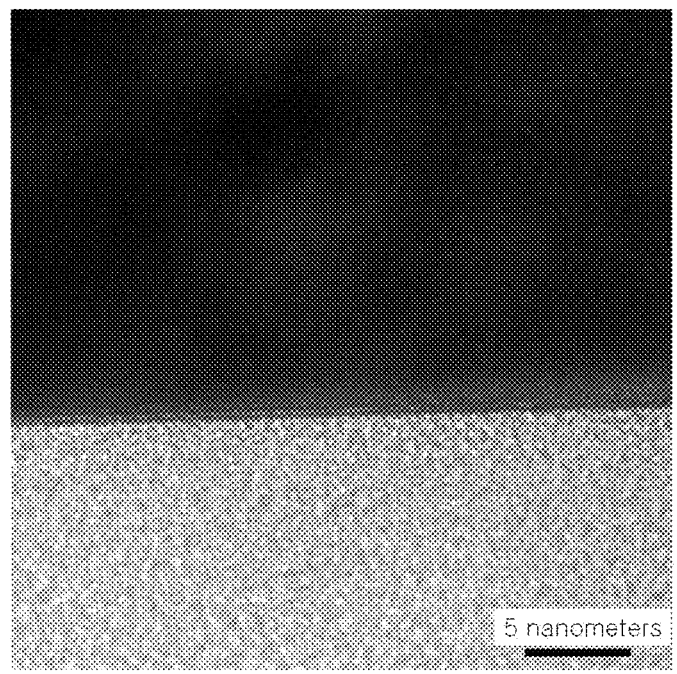
FIG. 4 is a transmission electron microscope ("TEM") photographic image of a graphene base obtained in Example 1.

FIG. 4 is a transmission electron microscope ("TEM") photographic image of the graphene base obtained in Example 1. As shown in FIG. 4, the graphene having a layer structure is formed between the silicon substrate, which is gray in FIG. 4, and the nickel layer, which is black in FIG. 4.

Next, the silicon substrate with the graphene was dissolved in a 0.1 M ferric chloride ($FeCl_3$) solution for 1 minute to remove the nickel layer. Accordingly, a graphene base in which the graphene is formed directly on the silicon substrate was prepared.

Figure 6:
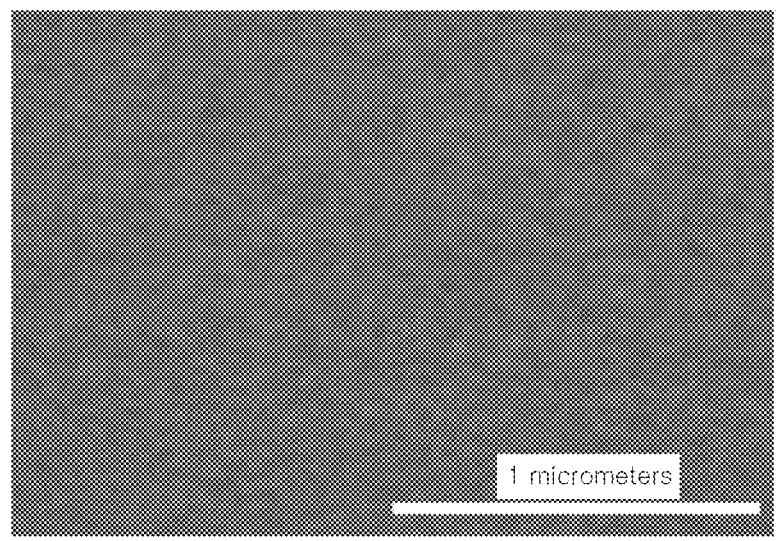
FIG. 6 is a scanning electron microscope ("SEM") photographic image of graphene obtained in Example 1.

FIG. 6 is a scanning electron microscope ("SEM") photographic image of the graphene base obtained in Example 1. Referring to FIG. 6, the graphene base does not have any wrinkles.

Example 2

A 3 cm by 3 cm silicon substrate coated with 100 nm of $SiO_2$ was processed with UV/$O_3$ for 30 minutes, and then impregnated for 20 minutes in a 50 mM anthracenyl trimethoxysilane hexane solution under a nitrogen atmosphere. Next, the silicon substrate was removed from the anthracenyl trimethoxysilane hexane solution, the residue thereof was cleaned with hexane, and then the silicon substrate was baked for 20 minutes at a temperature of 120° C. The silicon substrate was put into a toluene solution and then processed for 3 minutes with ultrasonic waves so as to remove materials aggregated on the surface of the silicon substrate. Accordingly, a single layer of a self-assembled layer was obtained.

Then, a 300 nm thick nickel layer was formed on the silicon substrate by depositing nickel by thermal-evaporation.

The silicon substrate on which anthracenyl trimethoxysilane and the nickel layer are formed was thermally-treated in a furnace for 1 hour at a temperature of 900° C. under a nitrogen atmosphere so as to form a graphene base.

Figure 5:
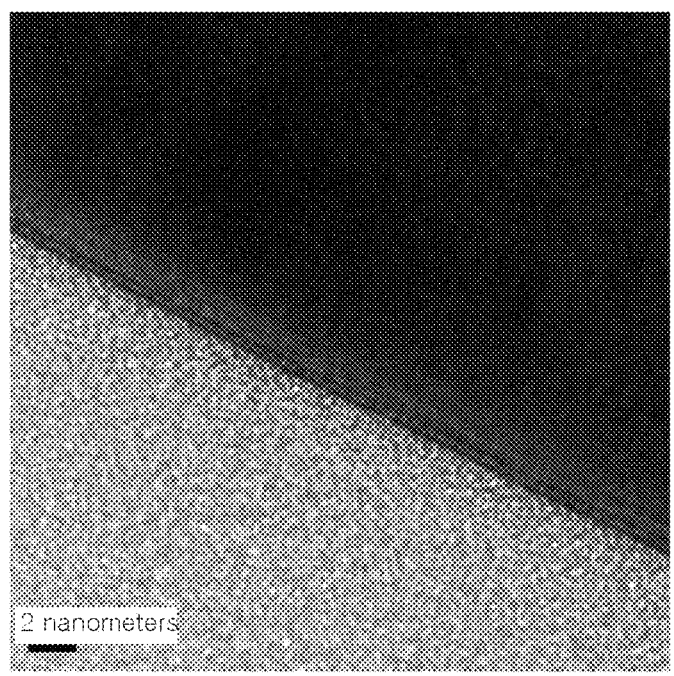
FIG. 5 is a TEM photographic image of a graphene base obtained in Example 2.

FIG. 5 is a TEM photographic image of the graphene base obtained in Example 2. As shown in FIG. 5, the graphene having a layer structure is formed between the silicon substrate, which is gray in FIG. 5, and the nickel layer, which is black in FIG. 5.

Next, the silicon substrate with the graphene was dissolved in 0.7 M nitric acid ($HNO_3$) for 24 hours, so as to remove the nickel layer. Accordingly, a graphene base in which the graphene is formed on the silicon substrate was prepared.

Figure 7:
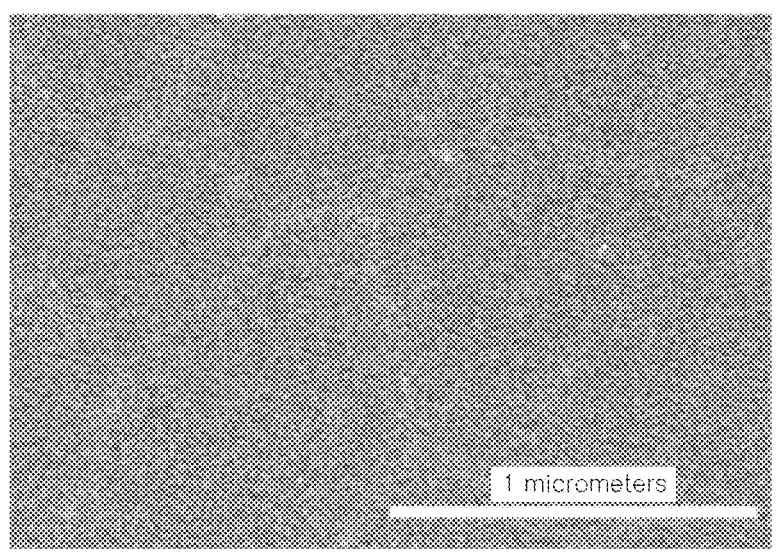
FIG. 7 is a SEM photographic image of graphene obtained in Example 2.

FIG. 7 is a SEM photographic image of the graphene base obtained in Example 2. Referring to FIG. 7, the graphene base does not have any wrinkles.

Example 3

Surface pressure a 10 millimolar (mM) hexane solution of 10,12-pentacosadianoyic acid was measured after loading 10 microliters (μL) of the hexane solution onto water. Then a 3 cm by 3 cm silicon substrate, which was coated with 100 nm of $SiO_2$, was inserted into a holder and a layer of the 10,12-pentacosadianoyic acid (as the carbon material) was arranged thereon using a Langmuir-Blodgett method. The silicon substrate was removed from the holder, the residue on the silicon substrate was cleaned with hexane, and then the silicon substrate was hardened for 10 minutes in a UV exposure device.

Next, a 300 nm thick layer of nickel was formed on the silicon substrate by depositing nickel by e-beam evaporation.

The hardened silicon substrate, on which 10,12-pentacosadianoyic acid is applied and the nickel layer is formed, was thermally-treated in a furnace for 1 hour at a temperature of 900° C. under a nitrogen atmosphere so as to form graphene on the silicon substrate, thereby preparing a graphene base.

Next, the silicon substrate with the graphene was dissolved in a $FeCl_3$ solution of 0.1 M density for 1 minute, so as to remove the nickel layer. Accordingly, a graphene base in which the graphene is directly formed on the silicon substrate was prepared.

Example 4

An N-methyl-2-pyrrolidone ("NMP") solution of 5% poly methylmethacrylate was formed on a 3 cm by 3 cm silicon substrate coated with 100 nm of $SiO_2$ by using a spin coating method.

Next, 300 nm of a nickel layer was formed on the silicon substrate by depositing nickel on the silicon substrate by using e-beam evaporation.

The hardened silicon substrate, on which the polymer and the nickel layer are formed, was thermally-treated in a furnace for 12 hours at a temperature of 900° C. under a nitrogen atmosphere to form graphene on the silicon substrate, thereby preparing a graphene base.

Next, the silicon substrate with the graphene was dissolved in 50% $HNO_3$ for 1 minute, so as to remove the nickel layer. Accordingly, a graphene base in which the graphene is formed directly on the silicon substrate was prepared.

Figure 8:
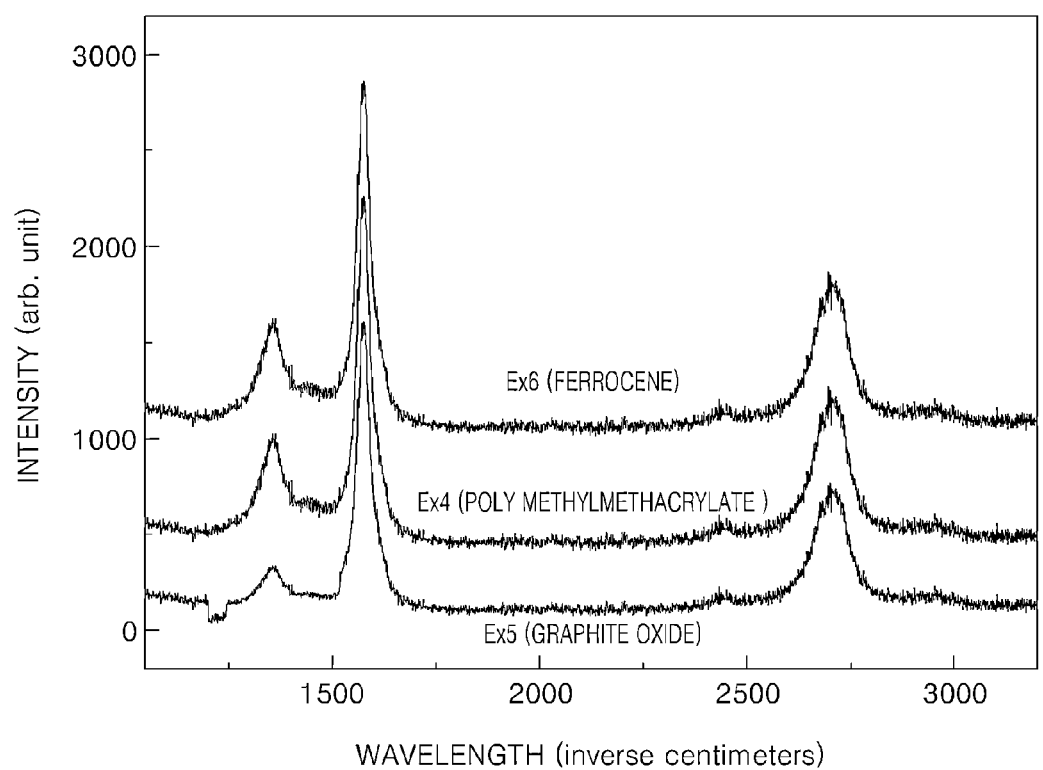
FIG. 8 is a Raman spectrum illustrating intensity (arbitrary units) versus wavelength (inverse centimeters, $cm^{-1}$) of graphene obtained in Example 4 (poly methylmethacrylate, Example 5 (graphite oxide), and Example 6 (ferrocene)

FIG. 8 is a Raman spectrum of materials of the graphene bases obtained in Examples 4, 5, and 6.

Example 5

A graphene base was prepared in the same manner as Example 4, except that a graphite oxide water-based solution was used instead of the NMP solution as a carbon material.

Example 6

A graphene base was prepared in the same manner as Example 4, except that a toluene solution of ferrocene was used instead of the NMP solution as a carbon material. FIG. 8 is a Raman spectrum of materials of the graphene bases obtained in Examples 4, 5, and 6, and D-bands are obseved in each spectrum. Generally, it has been found that a sheet resistance is significantly reduced in the presence of D-band. However, in the graphenes of Examples 4-6, a sheet resistance of 122 Ω/sq. was obtained in Hall measurement even in the presence of D-band. It shows that the graphenes of Example 4-6 has a small number of flaws.

Example 7

The graphene base was formed in the same matter as Example 1, except that a pattern was formed on graphene by forming a single self-assembled layer of octadecyl trichlorosilane in the same manner as in Example 1, and then removing carbon materials on an opened area by thermally treating the self-assembled layer of octadecyl trichlorosilane for 30 minutes with UV/O$_3$ using a shadow mask.

Figure 9:
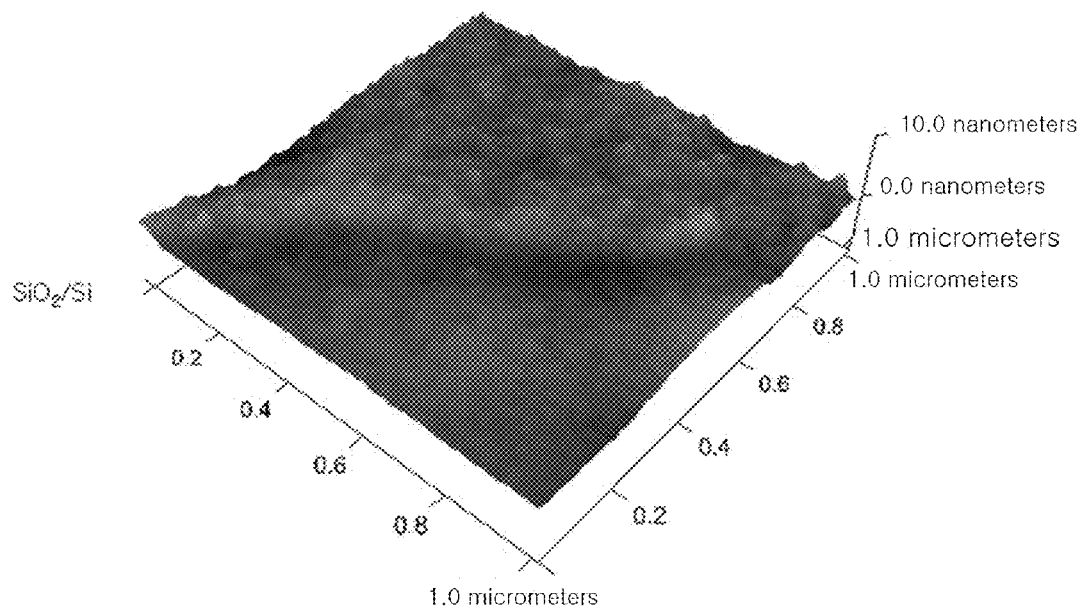
FIG. 9 is micrograph from an atomic force microscope ("AFM") showing a pattern of a self-assembled layer obtained in Example 7.
Figure 10:
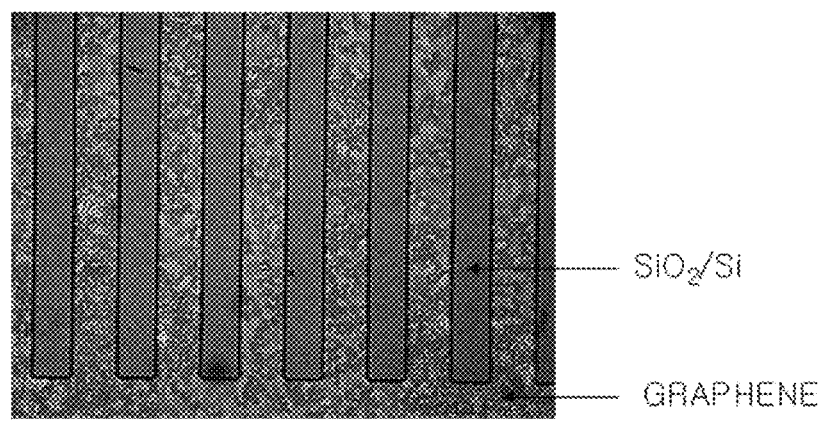
FIG. 10 is an optical photograph of a graphene pattern obtained in Example 7.

FIG. 9 is a diagram of an atomic force microscope ("AFM") result showing the self-assembled layer that is patterned by removing the carbon materials obtained in Example 7, and FIG. 10 is a diagram of an optical photograph of the pattern of graphene obtained in Example 7. As shown in FIG. 9, the self-assembled layer is patterned, and accordingly, as shown in FIG. 10, the graphene is formed to have a pattern.

According to the method described above, graphene having a small number of wrinkles and a large area can be easily formed on a substrate, and specifically, the graphene can be formed directly on the substrate without an intermediate layer. Accordingly, an electrode required for various electrical devices may be prepared in-situ.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of preparing a graphene base, the method comprising:
    disposing a carbon-based material on at least one surface of a substrate;
    disposing a graphitization catalyst layer on the carbon-based material in a way such that the carbon-based material is disposed between the graphitization catalyst layer and the substance; and
    forming graphene by thermally treating the substrate, on which the carbon-based material and the graphitization catalyst layer are formed, under an inert atmosphere or a reducing atmosphere.

2. The method of claim 1, wherein the carbon-based material is at least one selected from the group consisting of a carbon-containing polymer, a gaseous carbon-based material, amorphous carbon, and an organometallic compound.

3. The method of claim 1, further comprising patterning the carbon-based material on the substrate.

4. The method of claim 1, further comprising patterning the graphitization catalyst layer on the substrate.

5. The method of claim 1, further comprising
    forming a ceramic layer on the graphitization catalyst layer; and
    patterning the ceramic layer.

6. The method of claim 5, wherein the ceramic layer is an oxide layer.

7. The method of claim 1, wherein the graphene has a patterned shape.

8. The method of claim 1, wherein the carbon-based material has a patterned shape.

9. The method of claim 1, wherein the graphitization catalyst layer has a patterned shape.

10. The method of claim 1, wherein a length of at least one side of the graphene is equal to or greater than 1 millimeter.

11. The method of claim 1, wherein the graphitization catalyst layer comprises at least one selected from the group consisting of nickel, cobalt, iron, platinum, gold, aluminum, chromium, copper, magnesium, manganese, molybdenum, rhodium, silicon, thallium, titanium, tungsten, uranium, vanadium, zirconium, ruthenium, and iridium.

12. The method of claim 1, wherein a thickness of the graphitization catalyst layer is about nanometer to about 1 micrometer.

13. The method of claim 1, further comprising removing the graphitization catalyst layer by acid-treatment after the forming of the graphene.

14. The method of claim 13, further comprising forming a pattern on the graphitization catalyst layer by selectively removing a portion of the graphitization catalyst layer.

15. The method of claim 1, wherein a pattern layer is disposed on one surface of the substrate before the disposing of the carbon-based material on the substrate.

16. The method of claim 15, wherein the graphene has a shape which is the same as a shape of the pattern layer.

* * * * *